Patented July 27, 1937

2,088,052

UNITED STATES PATENT OFFICE 2,088,052

COATING COMPOSITION

George R. Ensminger, New Brunswick, N. J., assignor to E. I. du Pont de Nemours & Company, Wilmington, Del., a corporation of Delaware No Drawing. Application June 19, 1936, Serial No. 86,151

7 Claims. (Cl. 134—26)

This invention relates to improved coating compositions and more particularly to cellulose derivative-vinyl resin compositions which possess improved resistance to chalking and bronzing in service.

The films produced by the commonly available lacquers and enamels containing cellulose derivatives such as cellulose nitrate have a tendency to assume when exposed to atmospheric conditions a dull lifeless appearance. This is particularly the case in the lighter colors which contain preponderant quantities of white pigments such as zinc oxide, titanium oxide, extended titanium oxide as "Titanox", etc. This defect which is commonly known in the protective coating art as chalking is essentially a surface phenomenon produced by a gradual superficial disintegration of the protective film with the consequent freeing of the pigment particles. Since the trend in recent years has been toward the use of the lighter colored lacquer and enamels there is a demand for commercial products having improved resistance to this tendency of chalking.

Another fault common to lacquers, particularly those containing considerable quantities of iron blue pigments, is called bronzing. It is often observed on dark blue automobiles which have been exposed to the weather for some time and consists of a purplish or bronze discoloration. Sometimes it is seen on maroon and red finishes.

This invention has as an object the provision of an improved cellulose derivative coating composition which is characterized by the reduction or elimination of chalking and bronzing tendencies heretofore generally encountered when finishes prepared from cellulose derivative compositions are exposed to the weather or other erosive conditions.

Another object is the provision of cellulose derivative protective and decorative coating compositions which will more effectively retain their original luster and which are more durable when subjected to atmospheric conditions.

These objects are accomplished by combining cellulose derivatives with certain polymerization products of vinyl compounds and pigments which normally tend to chalk or bronze.

The following examples illustrate my preferred embodiments, and it will be understood that the scope of the invention is not limited thereby except as set forth in the appended claims.

*Example 1—White enamel*

| | Per cent by weight |
|---|---|
| Leaded zinc oxide | 11.25 |
| Vinyl resin solution* | 21.40 |
| Cellulose nitrate (viscosity ½ sec.) | 15.00 |
| Ethyl acetate | 15.20 |
| Ethyl alcohol (denatured) | 14.20 |
| Toluol | 6.35 |
| Butyl acetate | 5.10 |
| Dibutyl phthalate | 5.00 |
| High solvency petroleum hydrocarbon | 3.30 |
| Castor oil | 3.20 |
| | 100.00 |

*This resin is the product resulting from the joint polymerization of approximately 60% vinyl chloride and 40% vinyl acetate. The solution contains about 35% resin in a solvent made from 15% butyl acetate and 85% toluol.

The enamel composition is prepared by first dispersing the pigment in a suitable portion of the synthetic resin solution, adjusted by the addition of solvents and diluents, in such proportions as to permit working the mass in a ball mill or another suitable device. This pigmented intermediate is then placed in an ordinary paddle mixer together with the remaining ingredients in the proportions indicated, and the mixture is then thoroughly agitated until a homogeneous product is obtained.

*Example 2—Blue enamel*

| | Per cent by weight |
|---|---|
| Chinese blue pigment | 7.00 |
| Zinc oxide | .80 |
| Vinyl resin solution* | 21.40 |
| Cellulose nitrate (viscosity ½ sec.) | 15.00 |
| Ethyl acetate | 17.93 |
| Ethyl alcohol (denatured) | 14.47 |
| Naphtha | 5.93 |
| Dibutyl phthalate | 5.00 |
| High solvency petroleum hydrocarbon | 3.30 |
| Castor oil | 3.20 |
| Butyl acetate | 3.10 |
| Amyl alcohol | 1.36 |
| Butyl alcohol | 1.11 |
| Citric acid | .40 |
| | 100.00 |

*The resin used in this example is the same as that of Example 1. The pigment in this example may be dispersed in accordance with the process outlined in the copending application of Robert T. Hucks, Serial No. 91,965, filed July 22, 1936.

The final enamel is prepared by the method described for Example 1 which involves the addition of the remaining ingredients of the composition to the pigmented intermediate in agitator mixer, in the proportii indicated and the charge is then thoroughly mixed until a homogeneous product is obtained.

While the white pigment used in Example 1 is leaded zinc oxide it is not intended to limit the invention to this particular pigment. Other white pigments such as regular zinc oxide, titanium oxide, extended titanium oxide pigments, Timonox, antimony oxide, zirconium oxide, barium, lead and zinc titanates, etc., may be used with the vehicles of the compositions either alone or in combination to produce white compositions or they may be present as such in pigment mixtures particularly those in which the white pigment constituent is present in predominant quantity.

It is realized that zinc, tin and iron pigments in straight vinyl vehicles react with the resin and cause the film to darken when baked at the required temperature (approximately 1 hr. at 250° F.). However, in the case of cellulose nitrate—vinyl resin compositions of the present invention, the film may be force-dried for about 30 minutes at 140° F. and no reaction takes place. The improved enamels have shown no sign of darkening in service on automobile hoods after a period of two years nor have they shown any darkening on panels which have been exposed in Florida for extended periods. Zinc, tin and iron pigments, therefore, appear to be satisfactory from a stability angle for use in the cellulose nitrate—vinyl resin—compositions of this invention.

It has been found that the vehicles of the present invention are not only effective in eliminating bronzing tendencies of iron blue pigments in which this defect is most pronounced, such as Chinese, Prussian and Milori blues as illustrated by Chinese blue in Example 2, but they are also effective in eliminating this defect in enamels prepared from other pigments, such as certain red, maroon and green pigments.

In maroon enamels containing appreciable proportions of some types of synthetic resins a considerable "bronze" has frequently developed immediately following conventional buffing and polishing practices, particularly as applied in the finishing of automobiles, sometimes to such an extent as to make the finish commercially unacceptable and require complete refinishing of the affected areas. In the maroon enamels of the present invention, however, this defect is eliminated, thus affording a finish that is of outstanding merit in preventing the formation of this type of "bronze".

It is also necessary in order to obtain maximum chalk resistance with acceptable working properties that the cellulose nitrate—vinyl resin—plasticizer ratios be kept within certain limits. These ratios should be such that for each 10 parts by weight of cellulose nitrate, the amount of resin is not more than 10 parts, but not less than about 5 parts. If the ratio of resin to cellulose nitrate is substantially increased, the commercial utilization of these compositions is reduced because the sanding, rubbing and polishing operations customarily followed in the finishing industry cannot be satisfactorily practiced. The amount of plasticizer is about 2 parts when the maximum quantity of resin is used and is about 5 parts when the minimum amount of resin is used. If the resin ratio is reduced below the limit given, the degree of chalk resistance obtained is not of commercial significance. In general the amount of resin required for correcting bronzing tendencies is less than the amount required to provide chalk resistance in compositions containing chalking type pigments.

The types and proportions of solvents and diluents shown in the above examples may be varied over a considerable range and the substitution of an equivalent material or a change in proportions to suit conditions of application or other special requirements is considered within the ordinary practice of one skilled in the art.

The resin constituent of the new compositions is preferably a product resulting from the interpolymerization of vinyl chloride and vinyl acetate compounds. The vinyl derivatives, vinyl chloride and vinyl acetate, are prepared according to methods well known in the art. The process of polymerizing vinyl derivatives in mutual contact is disclosed in U. S. Patent 1,867,014. The resulting polymers are different from the mixtures of the esters polymerized separately, in that the product is tough and strong and is much better adapted to the purposes of the enamel industry with respect to adhesiveness and stability.

The coating compositions described herein may be utilized for finishing surfaces which are to be exposed to the destructive forces of the atmosphere. They find particular application as a protective coating for surfaces exposed to severe weather conditions, such as the finish of automobiles.

The coating compositions of the present invention are characterized by extraordinary life and durability, thus affording obvious economy for the consumer. Chalking and bronzing defects are greatly reduced or entirely eliminated, and as a result the true color and original gloss of the finish are retained over a greater period.

Another advantage resides in the fact that ordinary films require frequent cleaning and polishing to retain a satisfactory appearance. However, with a film produced from the compositions of the present invention this labor is reduced to a minimum, and a finish is secured which resists flaking, cracking, and peeling to a very high degree.

It is apparent that many widely different embodiments of this invention may be made without departing from the spirit and scope thereof; and, therefore, it is not intended to be limited except as indicated in the appended claims.

I claim:

1. Coating composition a dry film of which remains free from chalking and bronzing under prolonged exposure to atmospheric conditions comprising a cellulose derivative, a resin resulting from the interpolymerization of a vinyl halide and a vinyl ester of the lower fatty acid series, a pigment which normally chalks or bronzes in a cellulose nitrate film, a plasticizer, and a volatile solvent for the resin and the cellulose derivative.

2. A coating composition a dry film of which remains free from chalking and bronzing under prolonged exposure to atmospheric conditions comprising a cellulose derivative, a resin resulting from the interpolymerization of vinyl chloride and vinyl acetate, a pigment which normally chalks or bronzes in a cellulose nitrate film, a plasticizer, and a volatile solvent for the resin and cellulose derivative, said resin being present in amounts between .5 and one part for each part of cellulose derivative, and said plasticizer being present in amount between .5 and .2 parts for each part of cellulose derivative.

3. A coating composition having approximately the following formula:

| | Per cent by weight |
|---|---|
| Chinese blue pigment | 7.00 |
| Zinc oxide | .80 |
| Vinyl resin solution | 21.40 |
| Cellulose nitrate (viscosity ½ sec.) | 15.00 |
| Ethyl acetate | 17.93 |
| Ethyl alcohol (denatured) | 14.47 |
| Naphtha | 5.93 |
| Dibutyl phthalate | 5.00 |
| High solvency petroleum hydrocarbon | 3.30 |
| Castor oil | 3.20 |
| Butyl acetate | 3.10 |
| Amyl alcohol | 1.36 |
| Butyl alcohol | 1.11 |
| Citric acid | .40 |
| | 100.00 |

4. A coating composition having approximately the following formula:

| | Per cent by weight |
|---|---|
| Leaded zinc oxide | 11.25 |
| Vinyl resin solution | 21.40 |
| Cellulose nitrate (viscosity ½ sec.) | 15.00 |
| Ethyl acetate | 15.20 |
| Ethyl alcohol (denatured) | 14.20 |
| Toluol | 6.35 |
| Butyl acetate | 5.10 |
| Dibutyl phthalate | 5.00 |
| High solvency petroleum hydrocarbon | 3.30 |
| Castor oil | 3.20 |
| | 100.00 |

5. Product of claim 1 in which the cellulose derivative is cellulose nitrate and the pigment is leaded zinc oxide.

6. Product of claim 1 in which the cellulose derivative is cellulose nitrate and the resin is the interpolymer of approximately 60% vinyl chloride and 40% vinyl acetate.

7. Product of claim 1 in which the pigment is an iron blue pigment.

GEORGE R. ENSMINGER.